No. 793,685. PATENTED JULY 4, 1905.
H. A. SCHNELBACH.
PROCESS OF DEPOSITING LAYERS OF GLASS ON GLASS ARTICLES.
APPLICATION FILED JULY 8, 1904.
2 SHEETS—SHEET 1.
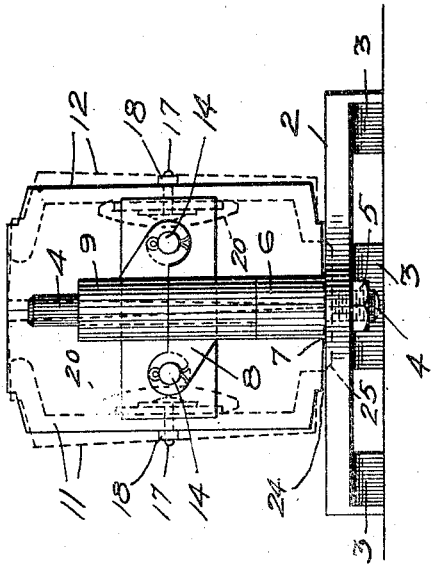
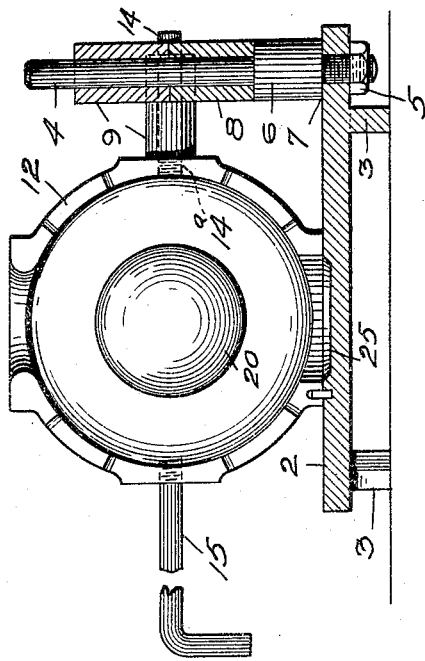
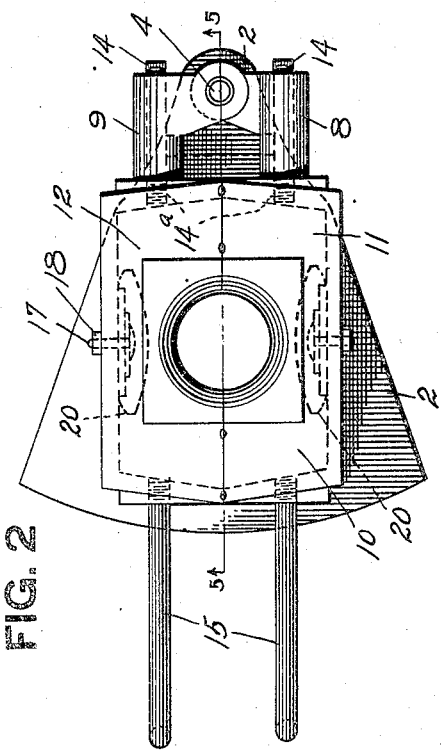
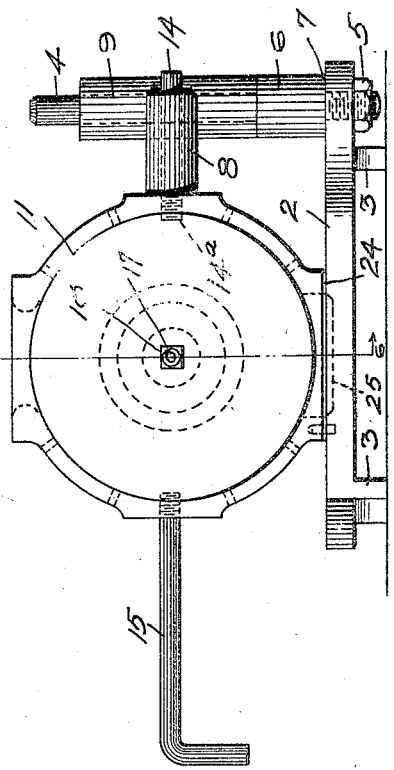
WITNESSES.
INVENTOR.

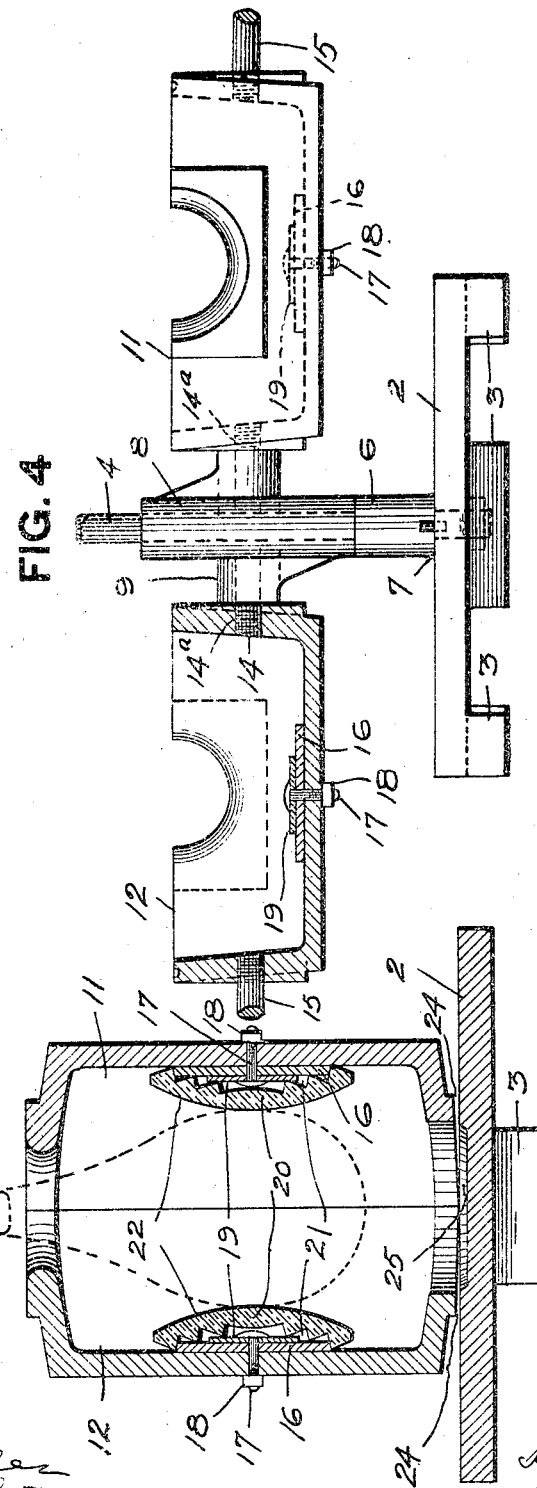

No. 793,685. Patented July 4, 1905.

UNITED STATES PATENT OFFICE.

HARRY A. SCHNELBACH, OF CHARLEROI, PENNSYLVANIA, ASSIGNOR TO MACBETH-EVANS GLASS COMPANY, OF PITTSBURG, PENNSYLVANIA, A CORPORATION OF PENNSYLVANIA.

PROCESS OF DEPOSITING LAYERS OF GLASS ON GLASS ARTICLES.

SPECIFICATION forming part of Letters Patent No. 793,685, dated July 4, 1905.

Application filed July 8, 1904. Serial No. 215,745.

*To all whom it may concern:*

Be it known that I, HARRY A. SCHNELBACH, a resident of Charleroi, in the county of Washington and State of Pennsylvania, have invented a new and useful Improvement in Processes of Depositing Layers of Glass on Glass Articles; and I do hereby declare the following to be a full, clear, and exact description thereof.

My invention relates to a process of forming lenses for railroad lanterns, signals, &c.

In the manufacture of lenses for railroad lanterns and signals, by way of illustration, it is customary according to the present method employed to first press the lens in a suitable mold. The lens is then placed in the bottom of a mold in a horizontal position with the face to be coated exposed and a mass of glass of the color desired is inserted in said mold on the end of a pipe, and the glass so introduced is blown so as to fill the mold-cavity and deposit upon the exposed face of the lens a thin layer of glass, which adheres to and becomes part of said lens. By this method but one lens is finished at a time and only a small portion of the glass blown within the mold can be utilized — namely, that portion deposited on the lens — the remaining portion being wasted.

The object of my invention is to provide a method for depositing a layer of glass upon the outer faces of two or more lenses at one operation of blowing, thereby utilizing more of the blown glass and greatly reducing the time and labor in the manufacture of such lenses.

To these ends my invention consists, generally stated, in the method of depositing a layer of glass on lenses consisting in arranging one or more lenses in an upright or substantially upright position within a mold with the outer face or faces of said lens or lenses exposed within the mold, blowing a body of glass within the mold-cavity into contact with the outer face or faces of said lens or lenses until a layer of glass is deposited on the outer face or faces of said lens or lenses, and, finally, destroying the hollow glass body blown within the mold.

To enable others skilled in the art to practice my invention, I will describe the same more fully with reference to the apparatus shown in the accompanying drawings, in which—

Figure 1 is a side elevation of the mold. Fig. 2 is a plan view showing the mold closed. Fig. 3 is a rear view of the mold closed. Fig. 4 is a front view of the mold open and partly in section tilted or turned to receive the articles. Fig. 5 is a section on the line 5 5, Fig. 2; and Fig. 6 is a section on the line 6 6, Fig. 1.

Like numerals indicate like parts in each of the figures.

The numeral 2 designates a suitable base or support carried by the feet 3. In the rear of the base 2 is the standard 4, which may be secured in place by the nut 5, the enlargement 6 on said standard forming a shoulder 7, resting upon the base 2. Hinged upon the standard 4 are the hinge members 8 and 9 of the partible mold 10. The mold-sections 11 and 12 are connected to the hinges 8 and 9, respectively, by means of the bolts or pins 14, said bolts passing through openings in said hinges and the threaded ends of said bolts screwing into threaded seats 14$^a$ in the mold-sections 11 and 12. By this construction the mold-sections 11 and 12 are hinged so as to swing upon the standard 4, while at the same time they are swiveled to the hinge members, so that they are capable of being tilted or turned over into a horizontal position, as indicated in Fig. 4.

Secured to the front of the mold-sections 11 and 12 are the handles, by means of which the said sections are operated.

Secured within the mold-sections 11 and 12 are the supports 16, which consist of disks of asbestos or other suitable material secured in place by means of the bolts 17 and nuts 18. A washer or plate 19 may be employed. The shape or form of these supports 16 may be changed to suit the article to be supported thereby; but as my invention will be illustrated in connection with the manufacture of lenses the support illustrated is adapted for that particular purpose.

In the employment of my invention the lenses 20, having been previously pressed in a suitable mold, are circular in form with the circular recess or depression 21 upon their inner faces, the outer faces 22 of said lenses being slightly convex. For the purpose of introducing the lenses to the mold and adjusting them on the supports 16 the mold-sections are thrown open, and by turning the handles 15 said mold-sections are thrown into the horizontal position indicated in Fig. 4. The lenses are then placed upon the supports 16. As these supports are preferably formed of asbestos, which is of a pliable nature, said supports may be made to form a tight fit with the depression 21 of the lens, so that some pressure is required to make said lens engage said supports, and as a consequence there is less liability of said lens being displaced when the mold-sections are raised to a substantially vertical position. The mold-sections are then swung toward each other, while at the same time the operator by slightly turning the handles 15 brings the mold-sections up into the position indicated in Fig. 3. Before bringing the mold-sections up into an entirely closed or vertical position the blower inserts a body of glass carried on the end of a suitable pipe of the color desired to be deposited upon the lenses and proceeds to blow the glass within the mold. As stated, the mold is not entirely closed or the mold-sections brought to a vertical position, but are held at a slight angle, as indicated in dotted lines, Fig. 3, so as to retain the lenses in position upon the support 16, for it is apparent that if the mold-sections were brought up to a vertical position there would be danger of the lenses slipping from their supports. This holding of the mold-sections slightly apart at their upper ends is made possible by leaving a slight space 24 between the bottom of said mold-sections and the base, together with a certain amount of play in the bolts or pin 14. However, as soon as the blower has blown the glass sufficiently so that the bulb formed thereby touches the faces of the lenses the mold-sections are then completely closed, for the lenses will then be held in position by the bulb of glass in contact therewith. The blower then continues to blow until the glass has been blown to fill the mold-cavity and cover the exposed faces of the lenses. The bottom of the bulbous form blown in this way will rest within the depression or recess 25, formed in the base 2, so that when the mold is opened upon the completion of the operation the blown glass will adhere to this recess 25 and will separate itself from the mold-sections. In opening the mold the sections are first swung apart and then tilted to the horizontal position indicated in Fig. 4, whereupon the finished lenses may be readily removed and others introduced.

By my improved method it is possible to deposit a layer of glass on two or more lenses at one operation of blowing, whereby a greater portion of the glass blown within the mold is utilized, a great saving in time, labor, and material resulting. Furthermore, by having the lenses supported in a vertical or substantially vertical position within the mold an even distribution of the glass over the outer face of the lens will be obtained, as there is no liability of a greater quantity of glass being deposited at the center of the lens than at other portions of its face, as was liable to occur where the lens was held in a horizontal position and the body of glass lowered thereon.

What I claim is—

1. The method of depositing a layer of glass on lenses consisting in arranging one or more lenses in an upright, or substantially upright, position within a mold with the outer face or faces of said lens or lenses exposed within the mold, blowing a body of glass within the mold-cavity into contact with the outer face or faces of said lens or lenses until a layer of glass is deposited on the outer face or faces of said lens or lenses, and finally destroying the hollow glass body blown within said mold.

2. The method of depositing a layer of glass on lenses consisting in arranging the lenses in an upright, or substantially upright position opposite to each other within a mold with the outer faces of said lenses exposed within the mold, blowing a body of glass within the mold-cavity into contact with the outer faces of said lenses until a layer of glass is deposited on the outer faces of said lenses, and finally destroying the hollow glass body blown within said mold.

In testimony whereof I, the said HARRY A. SCHNELBACH, have hereunto set my hand.

HARRY A. SCHNELBACH.

Witnesses:
A. N. HEPLER,
EMMA VERNON.